(12) United States Patent
Reddy et al.

(10) Patent No.: US 10,382,480 B2
(45) Date of Patent: Aug. 13, 2019

(54) DISTRIBUTED DENIAL OF SERVICE ATTACK PROTECTION FOR INTERNET OF THINGS DEVICES

(71) Applicant: Cisco Technology, Inc., San Jose, CA (US)

(72) Inventors: K Tirumaleswar Reddy, Karnataka (IN); Daniel G. Wing, Truckee, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 15/292,503

(22) Filed: Oct. 13, 2016

(65) Prior Publication Data
US 2018/0109554 A1 Apr. 19, 2018

(51) Int. Cl.
*H04L 29/06* (2006.01)
*H04W 12/08* (2009.01)
*H04W 4/70* (2018.01)

(52) U.S. Cl.
CPC ...... *H04L 63/1458* (2013.01); *H04L 63/0245* (2013.01); *H04L 63/0428* (2013.01); *H04L 63/08* (2013.01); *H04L 63/10* (2013.01); *H04W 4/70* (2018.02); *H04W 12/08* (2013.01); *H04L 2463/143* (2013.01)

(58) Field of Classification Search
None
See application file for complete search history.

(56) References Cited

U.S. PATENT DOCUMENTS

| 7,987,493 | B1 * | 7/2011 | Reams, III | H04L 63/1458 726/1 |
| 8,775,810 | B1 * | 7/2014 | Snodgrass | H04L 9/08 713/175 |
| 2003/0061514 | A1 * | 3/2003 | Bardsley | G06F 21/55 726/4 |

(Continued)

OTHER PUBLICATIONS

D. Hardt, Ed., "The OAuth 2.0 Authorization Framework", Internet Engineering Task Force (IETF), ISSN: 2070-1721, Oct. 2012, 76 pages.

(Continued)

*Primary Examiner* — Andrew J Steinle
(74) *Attorney, Agent, or Firm* — Edell, Shapiro & Finnan, LLC (57) ABSTRACT

Presented herein are techniques for remediating a distributed denial of service attack. A methodology includes, at a network device, such as a constrained resource Internet of Things (IoT) device, receiving from an authorization server cryptographic material sufficient to validate and decrypt tokens carried in packets, detecting a denial of service attack that employs packets containing invalid tokens, and in response to detecting the denial of service attack, signaling a remediation server for assistance to remediate the denial of service attack, and sending to the remediation server the cryptographic material over a secure communication channel such that the remediation server enables validation and decryption of tokens carried in packets, subsequent to detection of the denial of service attack, that are destined for the network device.

20 Claims, 7 Drawing Sheets

(56) References Cited

U.S. PATENT DOCUMENTS

2009/0271857 A1* 10/2009 Wang .................. H04L 47/2441
726/11
2018/0183802 A1* 6/2018 Choyi .................. H04L 63/105

OTHER PUBLICATIONS

A. Mortensen, et al., "Distributed Denial of Service (DDoS) Open Threat Signaling Requirements draft-ieff-dots-requirements-02", DOTS, Internet-Draft, Jul. 8, 2016, 17 pages.
"Authentication and Authorization for Constrained Environments", charter-ietf-ace-01, https://datatracker.ietf.org/doc/charter-ietf-ace/, 2 pages.

* cited by examiner

FIG.7 ly by an authorization server with the approval of the resource owner. The client uses the access token to access the protected resources hosted by the resource server.

DISTRIBUTED DENIAL OF SERVICE ATTACK PROTECTION FOR INTERNET OF THINGS DEVICES

TECHNICAL FIELD

The present disclosure relates to mitigating denial of service attacks in an electronic communications network.

BACKGROUND

The Open Authorization (OAuth) 2.0 authorization framework or standard enables a third-party application to obtain limited access to a service, either on behalf of a resource owner by orchestrating an approval interaction between the resource owner and the service, or by allowing the third-party application to obtain access on its own behalf. This authorization framework is being adopted in connection with granting access to Internet of Things (IoT) devices to govern who/what (client) can gain access to such a device (resource server) that is controlled by a resource owner.

More specifically, OAuth 2.0 defines an authorization layer that separates the role of the client from that of the resource owner. In OAuth 2.0, the client requests access to resources controlled by the resource owner and hosted by the resource server, and is issued a different set of credentials than those of the resource owner.

Instead of using the resource owner's credentials to access protected resources, the client obtains an access token, i.e., a string denoting a specific scope, lifetime, and other access attributes. Access tokens are issued to third-party clients by an authorization server with the approval of the resource owner. The client uses the access token to access the protected resources hosted by the resource server.

DESCRIPTION OF EXAMPLE EMBODIMENTS

Overview

Presented herein are techniques for remediating (distributed) denial of service (D)DoS attacks. A methodology includes, at a network device, such as a constrained resource Internet of Things (IoT) device, receiving from an authorization server cryptographic material sufficient to validate and decrypt tokens carried in packets, detecting a denial of service attack that employs packets containing invalid tokens, and in response to detecting the denial of service attack, signaling a remediation server for assistance to remediate the denial of service attack and sending to the remediation server the cryptographic material such that the remediation server enables validation and decryption of tokens in packets, subsequent to detection of the denial of service attack, that are destined for the network device.

A device or apparatus is also described. The device may be, for example, a firewall that is configured to protect the IoT device or other network device. The device includes an interface unit configured to enable network communications, a memory, and one or more processors coupled to the interface unit and the memory, and configured to discover a network device, receive from an authorization server cryptographic material sufficient to validate and decrypt tokens carried in packets that are destined for the network device, receive a given packet destined for the network device, determine whether the given packet contains a valid token, and if the given packet contains a valid token forward the given packet to the network device, and if the given packet contains an invalid token, drop the given packet such that the given packet does not reach the network device, determine that a denial of service attack employing invalid tokens is occurring against the network device and the denial of service attack exceeds the capabilities of the device to remediate the denial of service attack, and, in response, signal a remediation server for assistance to remediate the denial of service attack and send to the remediation server the cryptographic material.

Example Embodiments

As explained above, in accordance with OAuth 2.0, instead of using the resource owner's credentials to access protected resources, a client obtains an access token—a string denoting a specific scope, lifetime, and other access attributes. The access token is issued to the client by an authorization server with the approval of the resource owner. The client uses the access token to access the protected resources hosted by the resource server.

IoT devices are increasingly using OAuth 2.0 to control unauthorized access. An issue, however, with using OAuth is that the IoT device can be subjected to a Denial of Service (DoS) attack or Distributed DoS (DDoS) attack. That is, an attacker can flood a given IoT device with invalid OAuth tokens conveyed in, e.g., Constrained Application Protocol (CoAP) requests, and eventually exhaust CPU and memory resources on the IoT device. As IoT devices are resource-constrained in nature, they are even more susceptible to such access token flooding DoS or DDoS attacks. The following provides a mechanism to address this issue by leveraging the ability of an infrastructure such as the Distributed Denial of Service (DDoS) Open Threat Signaling (DOTS) protocol.

DOTS signaling communicates to appropriate entities the need for defensive action in anticipation of or in response to an attack, but does not dictate the form any defensive action takes. DOTS supplements calls for help with pertinent details about the detected attack, allowing those appropriate entities participating in DOTS to form ad hoc, adaptive alliances against DDoS attacks. The embodiments described herein are explained in the context of DOTS. However, those skilled in the art will appreciate that any signaling infrastructure could also be used in a manner similar to DOTS.

Figure 1:
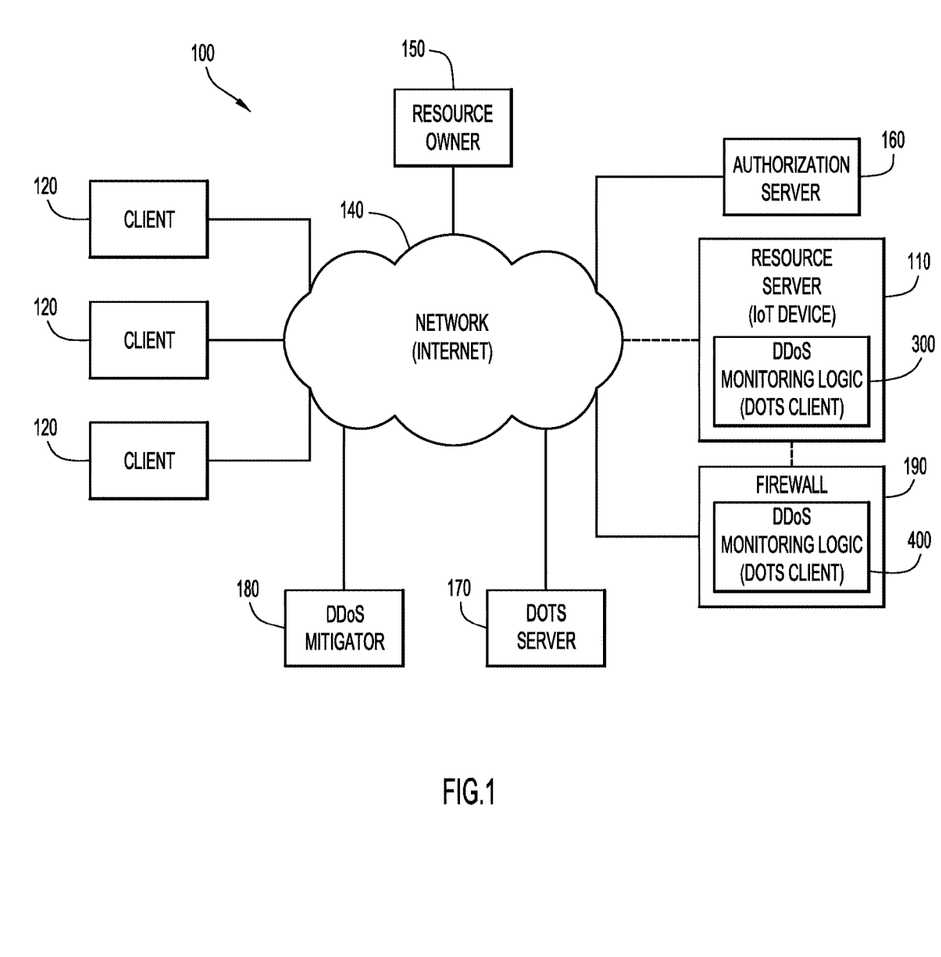
FIG. 1 depicts an electronic communications network in which Distributed Denial of Service ("DDoS") monitoring logic can be deployed in accordance with an example embodiment.

FIG. 1 depicts an electronic communications network 100 in which DDoS monitoring logic 300 and 400 can be deployed. As will be explained more fully in connection with FIGS. 3 and 4, DDoS monitoring logic 300, 400 is configured to detect a DDoS attack, and initiate particular signaling that will enable mitigation of that attack. The communications network 100 includes resource server 110, e.g., an IoT device, and a plurality of clients 120 that might want to access data from resource server 110. Communication may be by way of network 140, which may be the Internet, or any other private or public network. Also in communication via network 140 are a resource owner, an authorization server 160, a DOTS server 170, DDoS mitigator 180, and a firewall 190 that may be used to intercept communications traffic to and from resource server (IoT device) 110.

Figure 2:
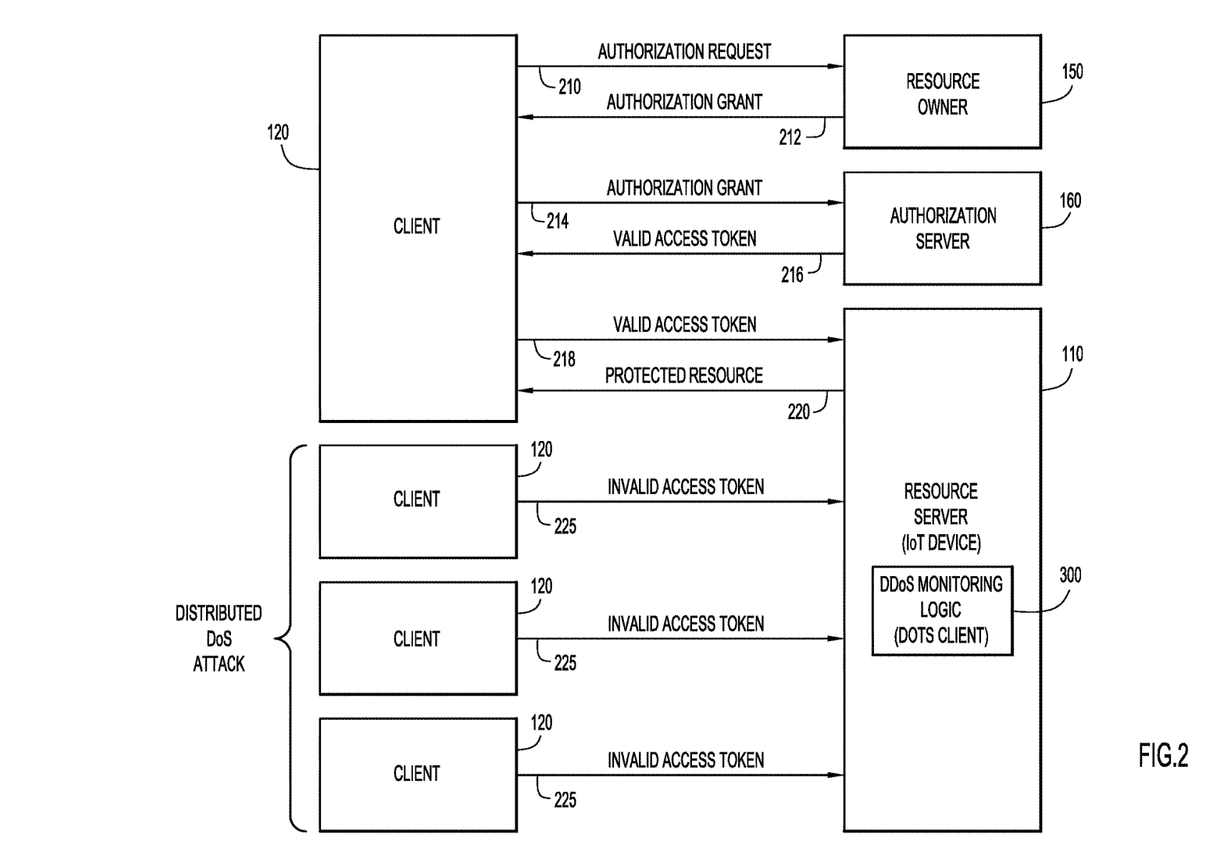
FIG. 2 depicts example communications among several components depicted in FIG. 1 in accordance with an example embodiment.

FIG. 2 depicts example communications among several components depicted in FIG. 1 in accordance with an example embodiment.

At 210, a client 120 requests authorization from the resource owner 150. The authorization request can be made directly to the resource owner 150 (as shown), or indirectly via the authorization server 160 as an intermediary. At 212, the client 120 receives an authorization grant, which is a credential representing the resource owner's authorization, of which there may be different types (e.g., granting more or less access to the resource, etc.).

At 214, the client 120 requests an access token by authenticating with the authorization server and presenting the authorization grant. At 216, the authorization server 160 authenticates the client 120 and validates the authorization grant, and if valid, issues a valid access token.

At 218, the client 120 requests the protected resource from the resource server (IoT device) 110 and authenticates by presenting the valid access token. At 220, the resource server 110 validates the access token, and if valid, serves the request.

As still further shown in FIG. 2, other clients 120 may be configured to mount a distributed denial of service (DDoS) attack against the resource server 110, which, as explained, may be a resource constrained IoT device. That is, other clients 120 may send multiple (e.g., tens, hundreds, thousands, etc.) invalid access tokens over a short or extended period of time, thereby overwhelming the IoT device and effectively denying valid tokens/requests from being processed. DDoS monitoring logic 300, as is explained below, is configured to detect such an event, and acting as a DOTS client, initiate appropriate DOTS signaling to help mitigate the attack.

Figure 3:
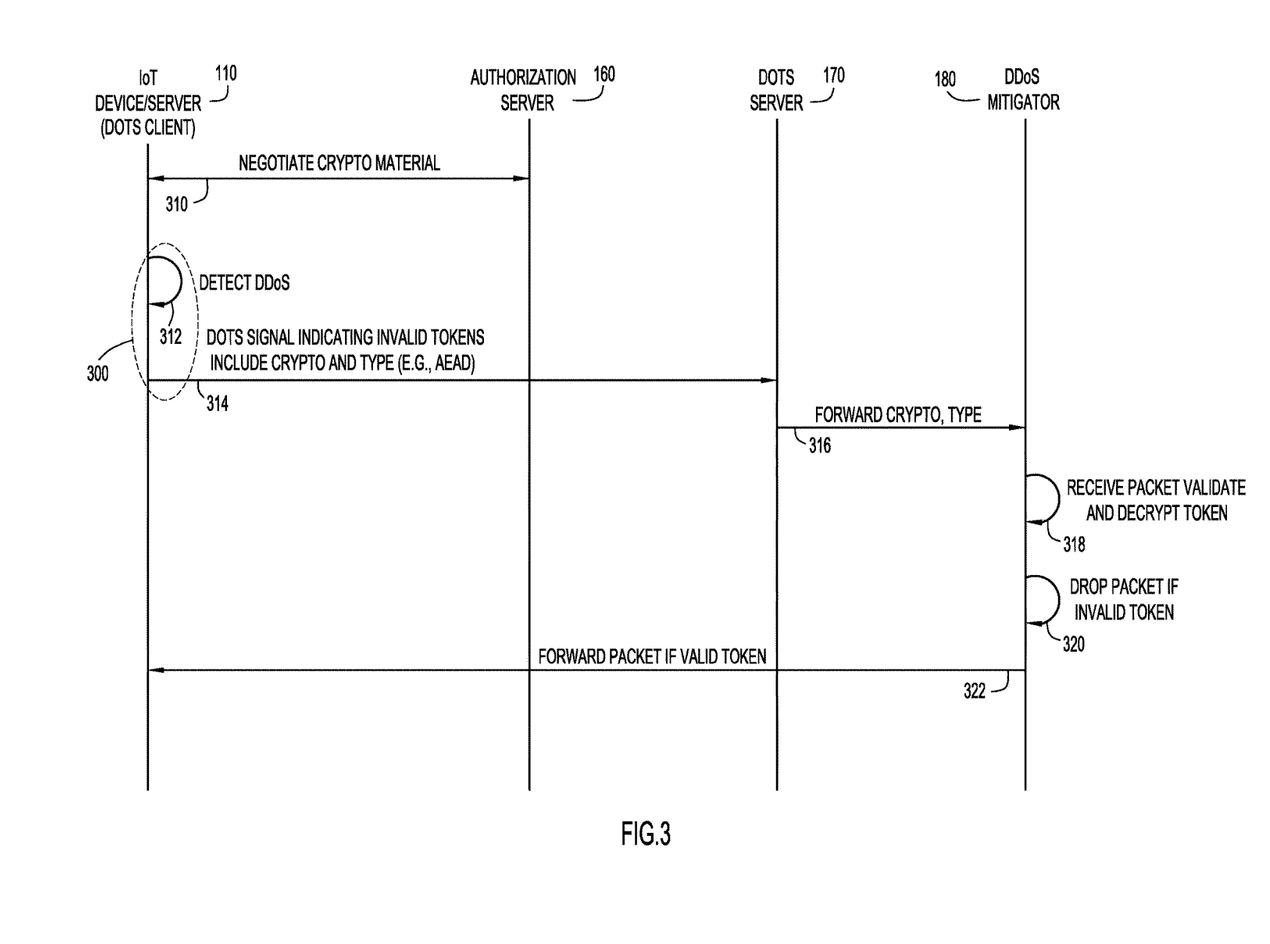
FIGS. 3 and 4 depict ladder diagrams of operations employing DDoS monitoring logic in accordance with an example embodiment.
Figure 4:
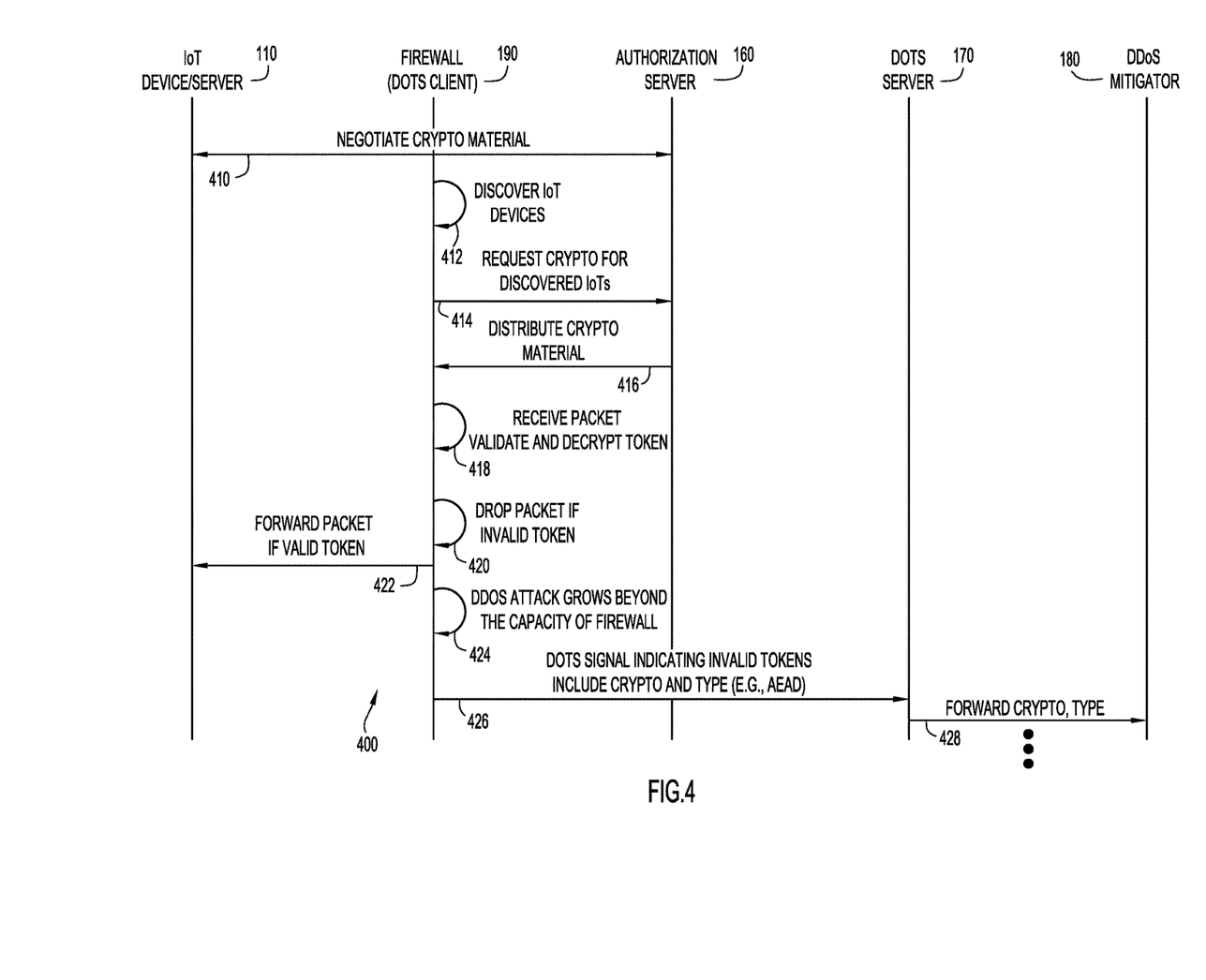

FIGS. 3 and 4 depict ladder diagrams of operations employing Denial of Service (DoS) monitoring logic in accordance with an example embodiment. FIG. 3 depicts an embodiment in which the IoT device 110 itself functions as a DOTS client to send appropriate DOTS signaling upon detection of an attack, whereas FIG. 4 depicts an embodiment in which a middle device, such as firewall 190, functions as a DOTS client on behalf of the IoT device 110.

Referring first to FIG. 3, at 310, IoT device 110 negotiates cryptographic material with authorization server 160. That is, authorization server 160 provides IoT device 110 the cryptographic material that is used to decrypt tokens that are received from clients 120. Since a token provides controlled access to a given IoT device, the token is generally not sent in the clear, but is rather encrypted. The cryptographic material provided to IoT device 110 at operation 310 enables IoT device to decrypt received tokens.

At 312, IoT device (resource server) 110 detects a DDoS attack. Such an attack can be deduced from memory or processing power overload or the number of invalid tokens it receives in a specific time interval, among other methods. Once such an attack is detected, IoT device 110, and more specifically, DDoS monitoring logic 300 functioning as a DOTS client, conveys, at 314, a DOTS signal to the DOTS server 170 to assist in mitigating the attack.

The DOTS signal indicates that the IoT device 110 is being subjected to a DDoS attack of, e.g., invalid access tokens. DDoS monitoring logic (i.e., the DOTS client) 300 also signals the cryptographic material to validate the token to the DOTS server. For example, if the access token is encrypted by the Authorization Server (AS) using AEAD, DDoS monitoring logic 300 signals the AEAD algorithm and the associated key to the DOTS server 170.

At 316, DOTS server 170 signals the cryptographic material learned from IoT device 110 to DOTS mitigator 180. Once DOTS mitigator 180 has been enabled on behalf of IoT device 110, traffic destined for IoT device 110 is routed via DOTS mitigator 180 so that DOTS mitigator 180 can scrub the traffic and eliminate, mitigate or remediate the attack.

Thus, at 318, DOTS mitigator 180 validates the access tokens received in requests from clients 120 via, e.g., constrained application protocol (CoAP) requests, drops requests with invalid tokens and only forwards, at 322, CoAP requests with valid access tokens to IoT device 110. For example, DOTS mitigator 180 may perform AEAD decryption, and if the authenticated decrypt operation fails, then the CoAP request is dropped, at 320.

Thus, FIG. 3 illustrates how an IoT device or resource server 110 can operate as a DOTS client using DDoS monitoring logic 300 to signal DOTS server 170 that the IoT device 110 is in need of assistance, and to further provide cryptographic material to the DOTS server, which provides the same ultimately to the DOTS mitigator 180, so the DDoS attack can be mitigated by dropping requests directed to IoT device 110 that have invalid tokens.

FIG. 4 illustrates another embodiment in which a middle device such as firewall 190 functions as a DOTS client on behalf of the IoT device 110. FIG. 1 for example, shows firewall 190 hosting DDoS monitoring logic 400. This logic may serve to protect IoT device 110 from requests having invalid tokens thereby avoiding a situation where IoT device 110 is overwhelmed in a denial of service attack, precluding requests including valid tokens from being served.

At 410, as in the former embodiment, IoT device 110 obtains cryptographic material from authorization server 160. IoT device 110 is thereafter ready to receive (CoAP) requests with tokens.

At 412, firewall 190 discovers or is provided with a list of all IoT devices for which it is responsible. That is, and again with reference to FIG. 1, traffic destined for IoT device 110 is first routed through firewall 190 and as such firewall 190 is the first line of defense for thwarting malicious traffic. Referring to FIG. 4, at 414, firewall 190 establishes a secure communication channel with authorization server 160 and conveys the identity of the IoT devices and requests the authorization server 160 to provide the cryptographic material required to the validate access tokens. It is noted that firewall 160 could either learn the identity of the IoT devices it protects by inspecting the traffic from the IoT devices (e.g., sensor information could be signaled in Sensor Markup Language (SenML) format in HTTP or CoAP) or by conveying the IP address of the IoT device to the authentication server and learning the IOT device identity.

At 416, authorization server 160 conveys the cryptographic material associated with the IoT devices protected by the (virtual) firewall. The authentication server and each IoT device negotiate unique cryptographic material (e.g., long-term symmetric key, encryption algorithm and lifetime of the long-term key). The cryptographic material is used by the authentication server to encrypt the access token, and used by the IoT device 110 to decrypt the access token. In one implementation, the authentication server pushes any updates to the cryptographic material to the firewall 190.

At 418, firewall 190 uses the cryptographic material to validate the access token of incoming requests. At 420, if firewall 190 determines that an incoming request includes an invalid token, the packet is dropped. That is, the request is not passed on to the IoT device 110, sparing the IoT device from having to process a request with an invalid token.

On the other hand, at 422, if the token that is decrypted is valid, that packet is forwarded to the IoT device 110.

At 424, the firewall may determine, due to the volume of traffic being received, that it can no longer handle an incoming DDoS attack. In response, DDoS monitoring logic 400 (functioning as a DOTS client) hosted by the firewall 190 may then, at 426, signal DOTS server 170 that assistance is needed, and pass the cryptographic material to the DOTS server 170. At 428, DOTS server 170 passes the cryptographic material to DDOS mitigator 180 to enable DDOS mitigator 180 to inspect traffic destined for the IoT device 110. In other words, firewall 190 (serving as a DOTS client) initiates the same method as depicted in FIG. 3 where the IoT device 110 (using DDoS monitoring logic 300) seeks assistance from a DOTS server.

In either embodiment, DDoS monitoring logic 300, 400 (operating as a DOTS client) may periodically query DOTS server 170 to check if the attack has stopped and once the DOTS client learns that the attack has stopped, it may request the DOTS mitigation service request to be terminated. DDoS monitoring logic 300, 400 may also signal the DOTS server or mitigator (or remediation server) to end the assistance to remediate the denial of service attack and to change the cryptographic material so that the remediation server can no longer validate and decrypt the token.

As explained, tokens carried in incoming packets are authenticated and decrypted. As such, an attacker can cause CPU depletion by sending bogus/invalid tokens carried in packets to a device, forcing it to authenticate (and discard) packets with invalid tokens. The discussion above focused primarily on a use case with an IoT device using a CoAP request, which is designed for relatively low-end devices that are especially vulnerable to this sort of attack. However, those skilled in the art will appreciate that protocols such as Datagram Transport Layer Security (DTLS) and IPsec can also be susceptible to (D)DoS attacks and thus the embodiments described herein may also be applicable to those contexts as well. It is noted that an OAuth 2.0 token is typically self-contained, and carries the public key or certificate of the client, so the IoT device 110 can validate the client identity. The token may also carry other fields including the lifetime of the token, timestamp the token was generated, etc. The DDoS mitigator 180 in addition to validating the token may also be configured to decrypt the token to validate the client identity sent in a (D)TLS handshake and prevent replay attacks (i.e., where an attacker (re)sends an expired token.

Figure 5:
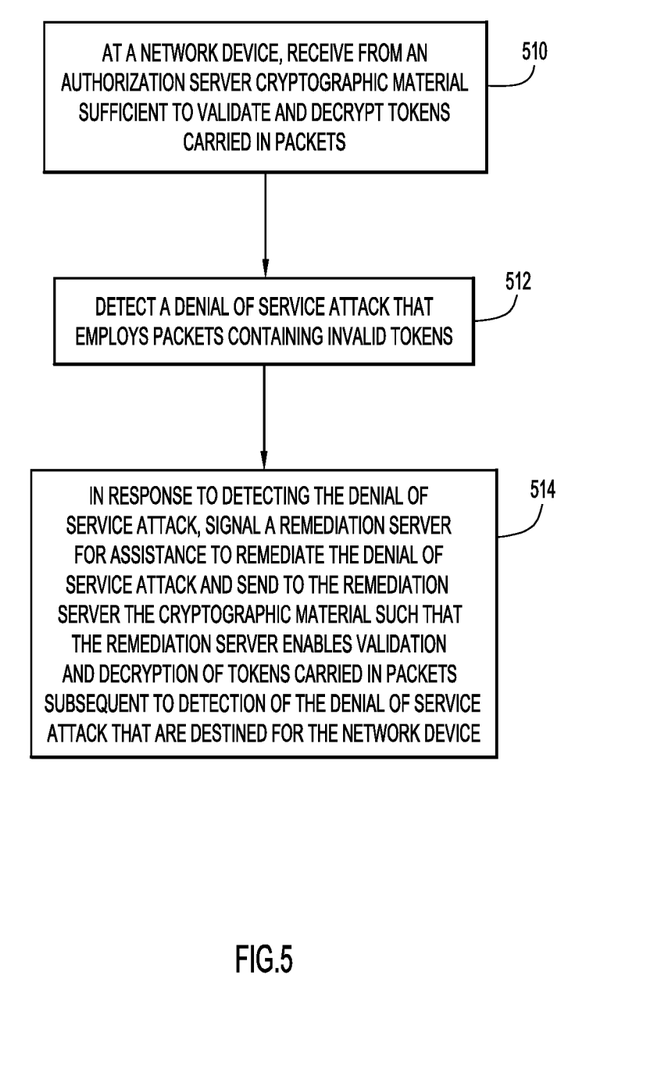
FIG. 5 is a flow chart depicting a series of operations for performing DDoS mitigation in accordance with an example embodiment.

FIG. 5 is a flow chart depicting a series of operations for performing DDoS mitigation in accordance with an example embodiment. In this case, the operations may be performed on IoT device 110 by DDoS monitoring logic 300. At 510, and at a network device (e.g., the IoT device), the methodology includes receiving from an authorization server cryptographic material sufficient to validate and decrypt tokens carried in packets. At 512, a denial of service attack that employs packets containing invalid tokens is detected. At 514, in response to detecting the denial of service attack, the IoT device signals a remediation server for assistance to remediate the denial of service attack and sends to the remediation server the cryptographic material such that the remediation server enables validation and decryption of tokens carried in packets, subsequent to detection of the denial of service attack, that are destined for the network device. That is, upon detection of a DoS or DDoS attack, the IoT device may act as a DOTS client seeking remediation services and provides cryptographic material that, e.g., enables a mitigator to successfully decrypt and validate tokens carried in packets destined for the IoT device.

Figure 6:
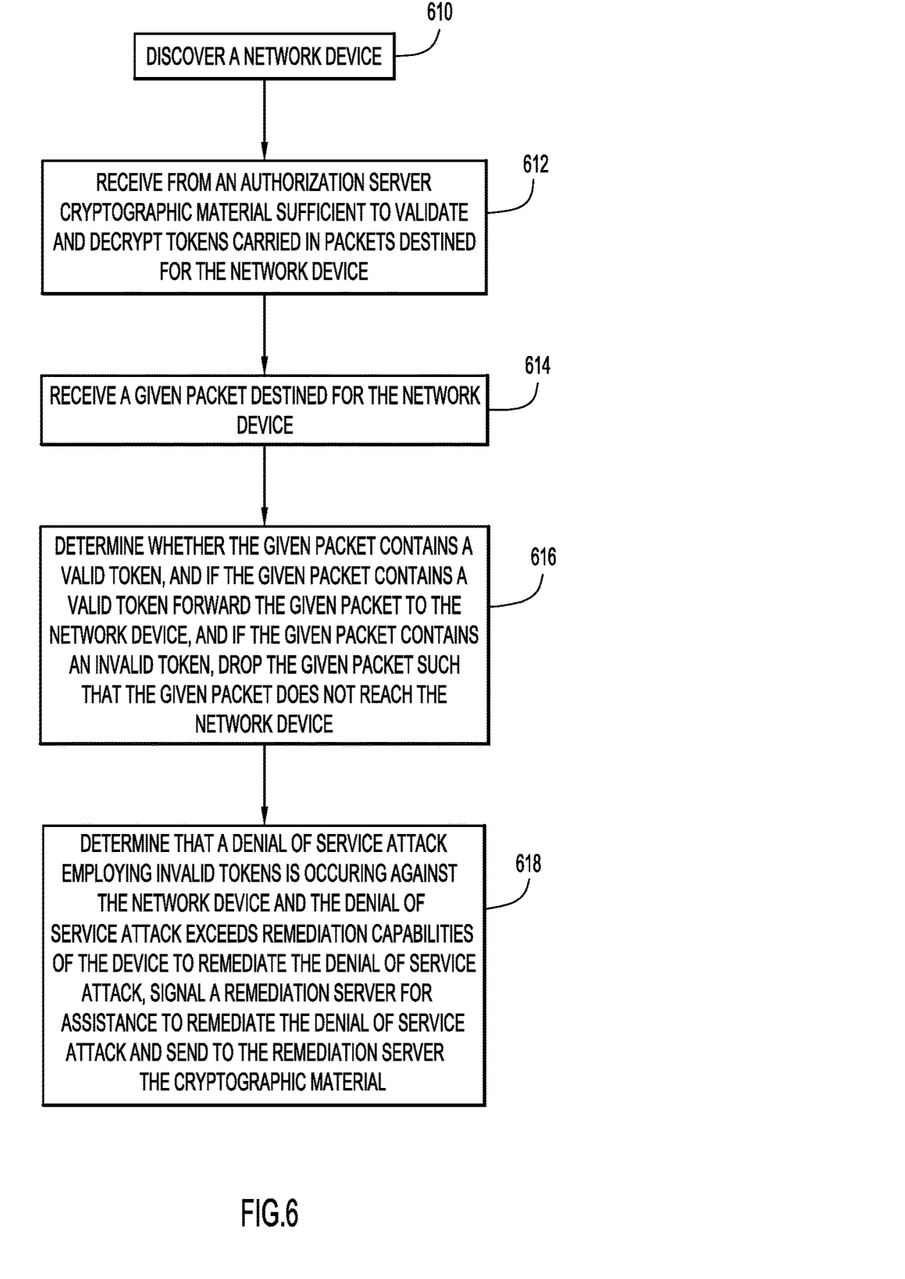
FIG. 6 is a flow chart depicting a series of operations for performing DDoS mitigation in accordance with another example embodiment.

FIG. 6 is a flow chart depicting a series of operations for performing DDoS mitigation in accordance with another example embodiment. In this case, a firewall for example, is configured to be a first line of defense against a DoS attack mounted against a network device such as an IoT device. Thus, the operation may be performed by DDoS monitoring logic 400 that is hosted by firewall 190. At 610, the firewall discovers a network device such as an IoT device for which it is responsible to protect from malicious communications. At 612, the firewall receives from an authorization server cryptographic material sufficient to validate and decrypt tokens carried in packets that are destined for the network device. At 614, the firewall receives a given packet destined for the network device. At 616, the firewall determines whether the given packet contains a valid token, and if the given packet contains a valid token forwards the given packet to the network device, and if the given packet contains an invalid token, drops the given packet such that the given packet does not reach the network device. At 618, the firewall determines that a denial of service attack employing invalid tokens is occurring against the network device and the denial of service attack exceeds the remediation capabilities of the device to remediate the denial of service attack, signals a remediation server for assistance to remediate the denial of service attack and sends to the remediation server the cryptographic material. That is, upon detection of a DoS or DDoS attack, the firewall may act as a DOTS client seeking remediation services and provides cryptographic material that, e.g., enables a mitigator to successfully decrypt and validate tokens carried in packets destined for the IoT device that the firewall is configured to protect.

Although the embodiment described above is described in connection with a firewall, those skilled in the art will appreciate that other network components can also host the logic and functionality described herein.

In sum, there is provided a methodology and related apparatus to protect IoT and other devices from DDoS attacks, by enabling an attacked network device to act as a DOTS client and signal a DOTS server for assistance. To enable mitigation, the network device also provides cryptographic material to the DOTS server.

Figure 7:
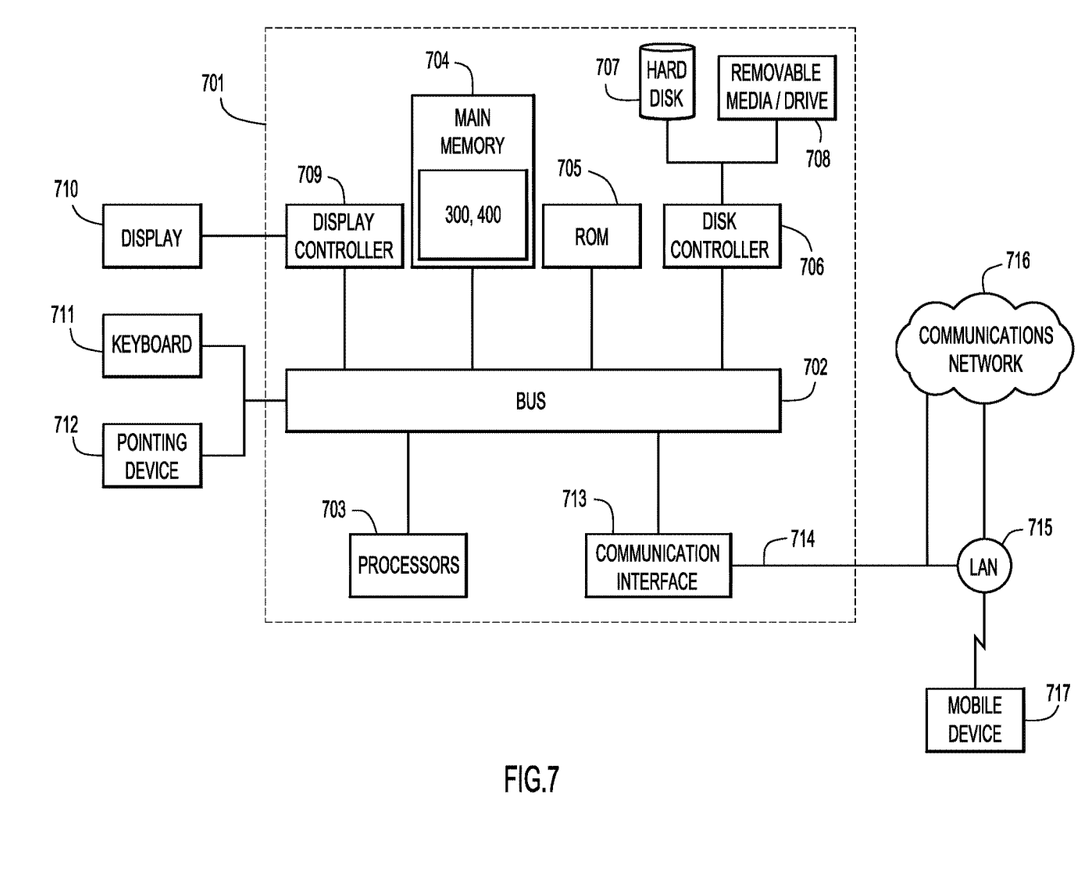
FIG. 7 depicts a device (e.g., an IoT device or server device) on which the several described embodiments may be implemented.

FIG. 7 depicts an apparatus on which the several described embodiments may be implemented. The apparatus, e.g., IoT device 110 (although such a device would likely be much simpler) or firewall 190, may be implemented on or as a computer system 701. The computer system 701 may be programmed to implement a computer based device. The computer system 701 includes a bus 702 or other communication mechanism for communicating information, and a processor 703 coupled with the bus 702 for processing the information. While the figure shows a single block 703 for a processor, it should be understood that the processor 703 represents a plurality of processors or processing cores, each of which can perform separate processing. The computer system 701 may also include a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions (e.g., the logic 300, 400 to perform the operations of FIGS. 5 and 6 described throughout) to be executed by processor 703. In addition, the main memory 704 may be used for storing temporary variables or other intermediate information during the execution of instructions by the processor 703.

The computer system 701 may further include a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 may also include a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT) or liquid crystal display (LCD), for displaying information to a computer user. The computer system 701 may include input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing operations of the embodiments described herein in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the described embodiments, and for enabling the computer system 701 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 613 provides a two-way data communication coupling to a network link 714 that is connected to, for example, a local area network (LAN) 715, or to another communications network 716. For example, the communication interface 713 may be a wired or wireless network interface card or modem (e.g., with SIM card) configured to attach to any packet switched (wired or wireless) LAN or WWAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 614 may provide a connection to a mobile device 717 such as a personal digital assistant (PDA) laptop computer, cellular telephone, or modem and SIM card integrated with a given device.

In summary, in one form, a method is provided. The method comprises at a network device, receiving from an authorization server cryptographic material sufficient to validate and decrypt tokens carried in packets, detecting a denial of service attack that employs packets containing invalid tokens; and in response to detecting the denial of service attack: signaling a remediation server for assistance to remediate the denial of service attack, and sending to the remediation server the cryptographic material over a secure communication channel such that the remediation server enables validation and decryption of tokens carried in packets, subsequent to detection of the denial of service attack, that are destined for the network device.

In another form, a device is provided that comprises an interface unit configured to enable network communications, a memory, and one or more processors coupled to the interface unit and the memory, and configured to: receive from an authorization server cryptographic material sufficient to validate and decrypt tokens carried in packets, detect a denial of service attack that employs packets containing invalid tokens, in response a detection of the denial of service attack, signal a remediation server for assistance to remediate the denial of service attack, and send to the remediation server the cryptographic material such that the remediation server enables validation and decryption of tokens carried in packets subsequent to detection of the denial of service attack and that are destined for the device.

In another form, a device is provided that comprises an interface unit configured to enable network communications, a memory, and one or more processors coupled to the interface unit and the memory, and configured to: discover a network device, receive cryptographic material sufficient to validate and decrypt tokens carried in packets destined for the network device, receive a given packet destined for the network device, determine whether the given packet contains a valid token, and if the given packet contains a valid token, forward the given packet to the network device, and if the given packet contains an invalid token, drop the given packet such that the given packet does not reach the network device, determine that a denial of service attack employing invalid tokens is occurring against the network device and the denial of service attack exceed remediation capabilities of the device, signal a remediation server for assistance to remediate the denial of service attack, and send to the remediation server the cryptographic material.

In still another form, a non-transitory computer readable storage media is provided that is encoded with instructions that, when executed by a processor, cause the processor to perform operations including: receiving from an authorization server cryptographic material sufficient to validate and decrypt tokens carried in packets; detecting a denial of service attack that employs packets containing invalid tokens; and in response to detecting the denial of service attack: signaling a remediation server for assistance to remediate the denial of service attack; and sending to the remediation server the cryptographic material over a secure communication channel such that the remediation server enables validation and decryption of tokens carried in packets, subsequent to detection of the denial of service attack, that are destined for the network device.

In yet another form, a non-transitory computer readable storage media is provided that is encoded with instructions that, when executed by a processor, cause the processor to perform operations including: discovering a network device; receiving cryptographic material sufficient to validate and decrypt tokens carried in packets destined for the network device; receiving a given packet destined for the network device; determining whether the given packet contains a valid token, and if the given packet contains a valid token, forward the given packet to the network device, and if the given packet contains an invalid token, drop the given packet such that the given packet does not reach the network device; determining that a denial of service attack employing invalid tokens is occurring against the network device and the denial of service attack exceed remediation capabilities of the device; signaling a remediation server for assistance to remediate the denial of service attack; and sending to the remediation server the cryptographic material.

The above description is intended by way of example only. Various modifications and structural changes may be made therein without departing from the scope of the concepts described herein and within the scope and range of equivalents of the claims.

What is claimed is:

1. A method comprising:
   at a network device, receiving from an authorization server cryptographic material sufficient to validate and decrypt tokens carried in packets;
   detecting a denial of service attack that employs packets containing invalid tokens; and
   in response to detecting the denial of service attack:
      signaling a remediation server for assistance to remediate the denial of service attack;
      sending to the remediation server the cryptographic material over a secure communication channel such that, subsequent to detection of the denial of service attack, the remediation server, using the cryptographic material, validates and decrypts tokens carried in packets that are destined for the network device and that originate from a device other than the remediation server; and
      receiving, at the network device, via the remediation server, packets each containing a valid token.

2. The method of claim 1, wherein the token is compliant with the Open Authorization 2.0 standard.

3. The method of claim 1, wherein the remediation server is a Distributed Denial of Service (DDoS) Open Threat Signaling (DOTS) server and the signaling is compliant with DOTS signaling.

4. The method of claim 1, wherein the packets are received in accordance with a Constrained Application Protocol (CoAP) request.

5. The method of claim 1, further comprising querying the remediation server to learn if the denial of service attack has stopped and, in response to learning that the denial of service attack has stopped, signaling the remediation server to end the assistance to remediate the denial of service attack.

6. The method of claim 1, further comprising, at a network firewall:
discovering the network device;
receiving a given packet destined for the network device;
determining whether the given packet contains a valid token, and when the given packet contains the valid token forwarding the given packet to the network device, and when the given packet does not contain the valid token, dropping the given packet such that the given packet does not reach the network device.

7. The method of claim 6, further comprising receiving the cryptographic material at the network firewall.

8. The method of claim 7, wherein the cryptographic material is received from the authorization server.

9. The method of claim 6, further comprising, at the network firewall:
determining that the denial of service attack exceeds the capabilities of the network firewall to remediate the denial of service attack;
signaling the remediation server for assistance to remediate the denial of service attack; and
sending to the remediation server the cryptographic material.

10. The method of claim 6, wherein the network firewall operates as a Distributed Denial of Service (DDoS) Open Threat Signaling (DOTS) client.

11. A device comprising:
an interface unit configured to enable network communications;
a memory; and
one or more processors coupled to the interface unit and the memory, and configured to:
receive from an authorization server cryptographic material sufficient to validate and decrypt tokens carried in packets;
detect a denial of service attack that employs packets containing invalid tokens;
in response to a detection of the denial of service attack, signal a remediation server for assistance to remediate the denial of service attack, and send to the remediation server the cryptographic material such that, subsequent to detection of the denial of service attack, the remediation server, using the cryptographic material, validates and decrypts tokens carried in packets that are destined for the device and that originate from a device other than the remediation server; and
receive, via the remediation server, packets each containing a valid token.

12. The device of claim 11, wherein the token is a token compliant with the Open Authorization 2.0 standard.

13. The device of claim 11, wherein the remediation server is a Distributed Denial of Service (DDoS) Open Threat Signaling (DOTS) server and the one or more processors are configured to signal the remediation server compliant with DOTS signaling.

14. The device of claim 11, wherein the one or more processors are configured to receive packets in accordance with a Constrained Application Protocol (CoAP) request.

15. A device comprising:
an interface unit configured to enable network communications;
a memory; and
one or more processors coupled to the interface unit and the memory, and configured to:
discover a network device;
receive cryptographic material sufficient to validate and decrypt tokens carried in packets destined for the network device;
receive a given packet destined for the network device;
determine whether the given packet contains a valid token, and when the given packet contains a valid token, forward the given packet to the network device, and when the given packet contains an invalid token, drop the given packet such that the given packet does not reach the network device;
determine that a denial of service attack employing invalid tokens is occurring against the network device and the denial of service attack exceeds remediation capabilities of the device;
signal a remediation server for assistance to remediate the denial of service attack; and
send to the remediation server the cryptographic material, such that the network device thereafter receives packets each containing a valid token.

16. The device of claim 15, wherein the device comprises a firewall that is configured to protect the network device from malicious communications.

17. The device of claim 15, wherein the one or more processors are configured as a Distributed Denial of Service (DDoS) Open Threat Signaling (DOTS) client and the one or processors are configured to signal the remediation server consistent with DOTS signaling.

18. The device of claim 15, wherein the remediation server is a Distributed Denial of Service (DDoS) Open Threat Signaling (DOTS) server and the one or processors are configured to signal the remediation server consistent with DOTS signaling.

19. The device of claim 15, wherein the token is compliant with the Open Authorization 2.0 standard.

20. The device of claim 15, wherein the one or more processors are configured to receive the given packet in accordance with a Constrained Application Protocol (CoAP) request.

* * * * *